(12) United States Patent
Brinkman et al.

(10) Patent No.: US 7,125,209 B1
(45) Date of Patent: Oct. 24, 2006

(54) QUICK-CHANGE MECHANISM FOR USE WITH THE STATIONARY SPINDLE OF A DAVENPORT® AUTOMATIC SCREW MACHINE

(75) Inventors: Robert J. Brinkman, Rochester, NY (US); Paul W. Allart, Rochester, NY (US); David G. Cole, Rochester, NY (US); Liberato Pietrantoni, Rochester, NY (US)

(73) Assignee: Brinkman Products, Inc., Rochester, NY (US)

( * ) Notice: Subject to any disclaimer, the term of this patent is extended or adjusted under 35 U.S.C. 154(b) by 0 days.

(21) Appl. No.: 11/120,235

(22) Filed: May 2, 2005

(51) Int. Cl.
  *B23B 31/11* (2006.01)
  *B23C 5/22* (2006.01)
(52) U.S. Cl. .................... 409/232; 279/99; 408/239 A; 82/160
(58) Field of Classification Search .......... 279/99–101, 279/143–145; 82/157–161; 409/232, 234; 408/239 A, 239 R; 403/300, 305, 320, 334
See application file for complete search history.

(56) References Cited

U.S. PATENT DOCUMENTS

| | | | | |
|---|---|---|---|---|
| 1,156,336 A | * | 10/1915 | Wegland | 279/99 |
| 1,407,335 A | * | 2/1922 | Reynolds et al. | 285/85 |
| 2,209,079 A | * | 7/1940 | Gilman | 175/412 |
| 2,330,686 A | * | 9/1943 | Cornell et al. | 403/333 |
| 2,761,688 A | * | 9/1956 | Mueller et al. | 408/110 |
| 3,489,191 A | * | 1/1970 | Blevins | 409/182 |
| 4,084,829 A | * | 4/1978 | Falchle et al. | 279/99 |
| 4,099,889 A | * | 7/1978 | Vig | 408/239 R |
| 4,854,788 A | * | 8/1989 | Okinaga | 408/59 |
| 2005/0229408 A1 | * | 10/2005 | Ngan et al. | 30/376 |

\* cited by examiner

*Primary Examiner*—Erica Cadugan
(74) *Attorney, Agent, or Firm*—Phillips Lytle LLP

(57) ABSTRACT

The present invention provides an improvement (20) in a Davenport® automatic screw machine having a stationary spindle. The improvement broadly includes a quick-change mechanism (26) associated with the stationary spindle (22). The mechanism includes mating frusto-conical first and second surfaces (28, 31) on the spindle and tool holder, and a multi-lead threaded connection (32) between the tool holder and stationary spindle such that the tool holder may be quickly locked into mating engagement with the stationary spindle by relative rotation therebetween through a short angular distance. The invention may also include an adjustment mechanism (33) that allows the axis ($x_2$—$x_2$) of the tool to be aligned with the axis ($x_1$—$x_1$) of a spaced rotatable spindle. This adjustment mechanism includes a base member (34), an adjustment member (35), and a locking mechanism (37) for selectively holding the adjustment member in the desired position relative to the base member.

14 Claims, 3 Drawing Sheets

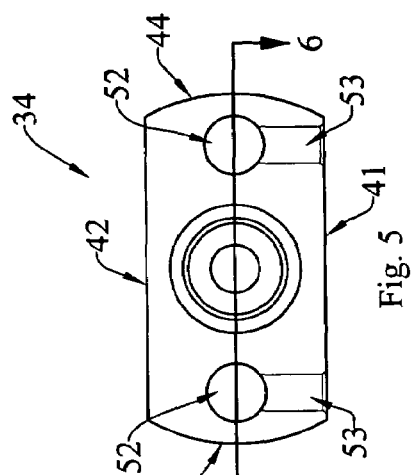
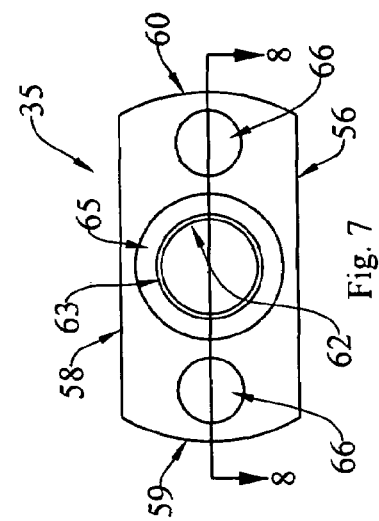
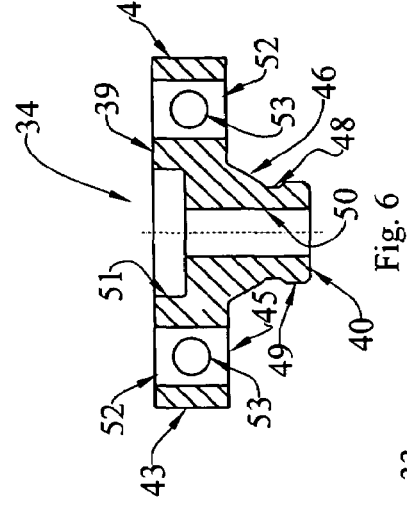
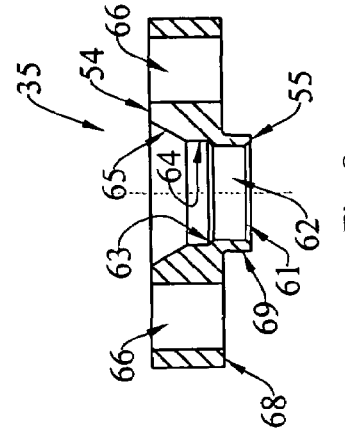
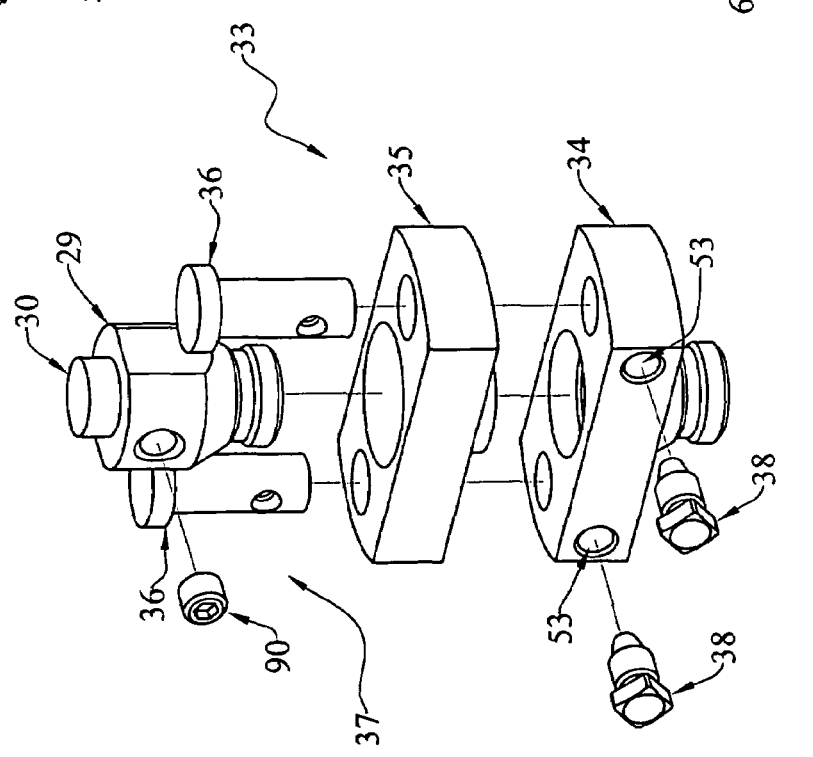

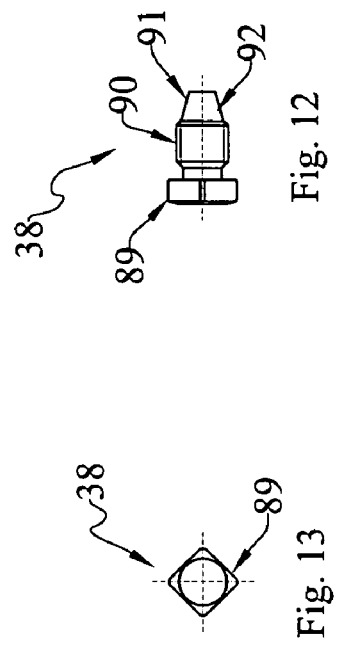
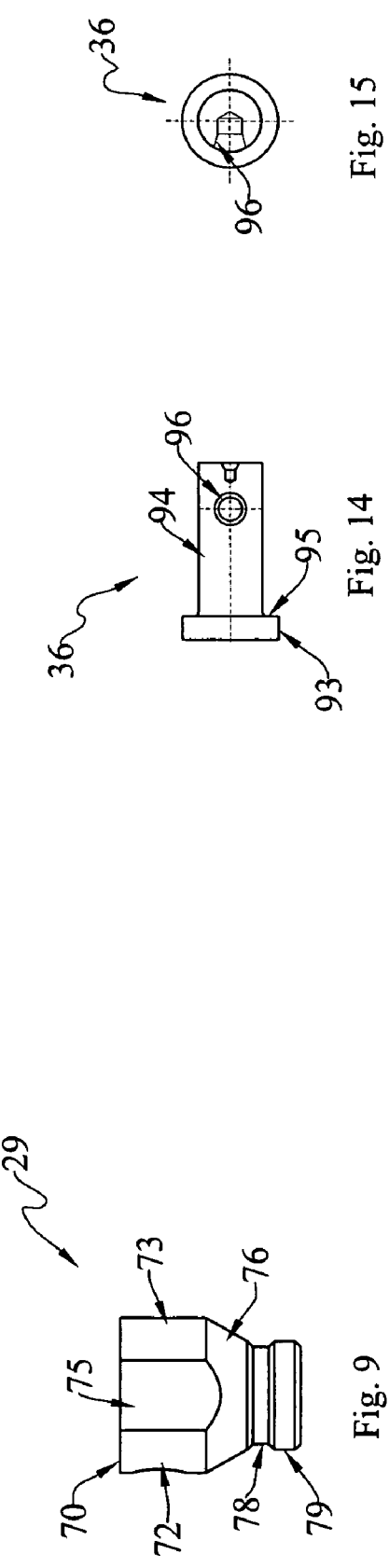
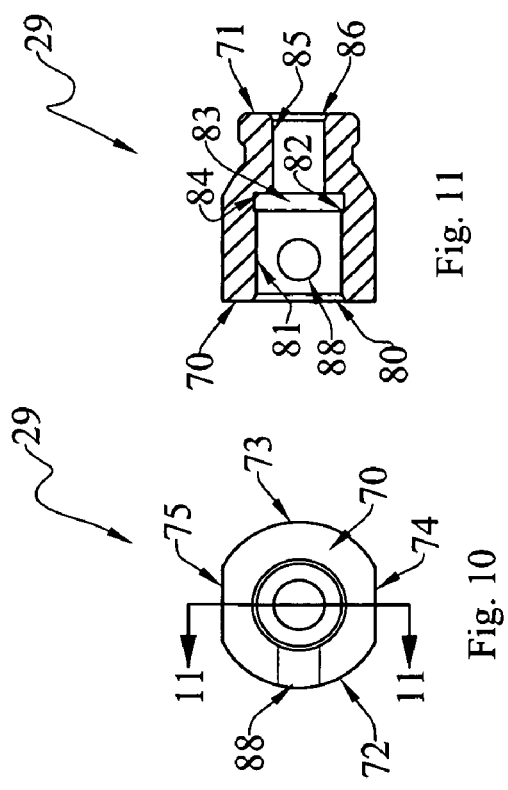

QUICK-CHANGE MECHANISM FOR USE WITH THE STATIONARY SPINDLE OF A DAVENPORT® AUTOMATIC SCREW MACHINE

TECHNICAL FIELD

The present invention relates generally to Davenport® automatic screw machines, and, more particularly, to a quick-change mechanism that is adapted to be operatively associated with the stationary spindle of such machines, which is particularly adapted to allow a tool to be quickly changed, and which permits the longitudinal axis of the tool to be aligned with the longitudinal axis of a rotatable spindle mounted on an indexable head of such machine.

BACKGROUND ART

A screw machine is a machine tool in which a tool is selectively moved to engage a rotating workpiece.

A Davenport® multi-spindle automatic screw machine (Davenport® is a registered trademark of, and such machines are available from, Davenport Machine, Inc., 167 Ames Street, Rochester, N.Y. 14611) typically has five workpiece-holding spindles that are rotatably indexable from station to station. At each station, a tool is adapted to be selectively moved to engage the rotating workpiece held in the proximate spindle. Some tools are carried by tool arms that are pivotally mounted on the revolving head cap of the screw machine. These tool arms are adapted to be selectively moved relative to the head cap at each station to cause the particular tool held therein to perform a specific machining operation on the relatively-rotating workpiece.

In such Davenport® screw machines, a stationary spindle is commonly mounted on the machine in axially-spaced relation to a rotatable spindle mounted on an indexable head. This stationary tool may hold a drill, a mill, or the like, to perform an operation on the end of the relatively-rotating workpiece.

In such applications, it is desirable to provide a quick-change mechanism such that the tool can be quickly changed with a minimum of machine down-time. At the same time, it is highly desirable that the longitudinal axis of a tool held in the stationary spindle be aligned with the longitudinal axis of the rotatable spindle.

Accordingly, it would be generally desirable to provide an improvement in a Davenport® automatic screw machine that would allow a quick change of various tools, and that would allow the axis of the tool held in the stationary spindle to be aligned with the axis of a rotatable spindle.

DISCLOSURE OF THE INVENTION

With parenthetical reference to the corresponding parts, portions or surfaces of the disclosed embodiment, merely for purposes of illustration and not by way of limitation, the present invention broadly provides a quick-change mechanism (26) for use in a Davenport® automatic screw machine (21) having a stationary spindle (22) mounted on a stationary head (23) in axially-spaced relation to a rotatable spindle (24) mounted on an indexable head (25).

The quick-change mechanism (26) is operatively associated with the stationary spindle (22), and broadly includes: a frusto-conical first surface (28) on the stationary spindle; a tool holder (29) adapted to hold a tool (30) and having a frusto-conical second surface (31), the first and second surfaces being so configured and arranged as to urge the tool holder to move radially toward a concentric position with respect to the stationary spindle longitudinal axis ($x_2$—$x_2$) when the tool holder is moved axially to engage the stationary spindle; and a multiple-lead threaded connection (32) between the tool holder and the stationary spindle such that the tool holder may be quickly locked into mating engagement with the stationary spindle by relative rotation therebetween through a short angular distance.

The multiple-lead threaded connection may be a quad-lead threaded connection. The short angular distance may be less than about one revolution of the tool holder relative to the stationary spindle. In one particular form, the short angular distance is about three-quarters of one revolution of the tool holder relative to the stationary spindle.

The improvement may further include an adjustment mechanism (33) for permitting the longitudinal axis of the stationary spindle (22) to be selectively aligned with the longitudinal axis ($x_1$—$x_1$) of the rotary spindle and for selectively holding the tool holder in such axially-aligned position.

The adjustment mechanism (33) may include: a base member (34) adapted to be selectively mounted on the stationary spindle; an adjustment member (35) adapted to be movably mounted on the base member and adapted to receive the tool holder; and a locking mechanism (37) for selectively holding the adjustment member in a desired position relative to the base member.

The base member may have a frusto-conical third surface (46) configured and arranged to urge the base member to move radially toward a concentric position with respect to the stationary spindle when the base member is moved axially to engage the stationary spindle. A multiple-lead threaded connection between the base member and the stationary spindle such that the base member may be quickly locked into mating engagement with the stationary spindle by relative movement through a short angular distance. The multiple-lead threaded connection may be a quad-lead threaded connection. The short angular distance is less than about one revolution of the tool holder relative to the stationary spindle. In one form, the short angular distance is about three-quarters of one revolution of the tool holder relative to the stationary spindle.

The adjustment member may have an opening (65) arranged to receive the portion of the tool holder having the second surface. The adjustment member opening and tool holder portion are preferably sized so as to permit some movement of the adjustment member relative to the base member in a radial direction relative to the axis of the second surface.

In the preferred form, each locking mechanism includes: at least one first hole (66) provided through the adjustment member; at least one second hole (52) provided in the base member and adapted to be aligned with the first hole; a pin (36) having a head portion (93) engaging the adjustment member and having a shank portion (94) passed through the first and second holes; wherein the base member is provided with a tapped hole (53) intersecting the second hole; and a screw (38) matingly received in the third hole and engaging the pin to hold the adjustment member to the base member. Preferably, at least two of the locking mechanisms are provided.

The pin may have a concave surface (96), and the screw may have a convex surface (91) arranged to engage the concave surface.

Accordingly, the general object of the invention is to provide an improved quick-change mechanism that is adapted to be associate with the stationary spindle of a Davenport® automatic screw machine.

Another object is to provide a quick-change mechanism for use with the stationary spindle of a Davenport® automatic screw machine that allows a tool holder to be axially aligned with the longitudinal axis of the stationary spindle.

Another object is to provide a quick-change mechanism in a Davenport® automatic screw machine that allows a tool held in the stationary spindle to be aligned with the rotatable spindle mounted on an indexable head.

Another object is to provide a quick-change mechanism for use in a Davenport® automatic screw machine that allows the stationary spindle to be quickly locked into engagement with the stationary spindle, or with an adjustment mechanism associated therewith, by relative rotation therebetween through a short angular distance.

These and other objects and advantages will become apparent from the foregoing and ongoing written specification, the drawings and the appended claims.

BRIEF DESCRIPTION OF THE DRAWINGS

FIG. 4 is an exploded perspective view of the quick-change and adjustment mechanisms shown in FIG. 1, this view showing the axis of such mechanisms as being vertical.

FIG. 5 is a top plan view of the base member shown in FIG. 4.

FIG. 6 is a fragmentary horizontal sectional view thereof, taken generally on line 6—6 of FIG. 5.

FIG. 7 is a top plan view of the adjustment member shown in FIG. 4.

FIG. 8 is a fragmentary vertical sectional view thereof, taken generally on line 8—8 of FIG. 7.

FIG. 9 is a side elevation of the tool holder shown in FIG. 1.

FIG. 10 is a top plan view of the tool holder shown in FIG. 9.

FIG. 11 is a fragmentary vertical sectional view thereof, taken generally on line 11—11 of FIG. 10.

FIG. 12 is a side elevation of a locking screw shown in FIG. 4.

FIG. 13 is a left end elevation of the locking screw shown in FIG. 12.

FIG. 14 is a side elevation of one of the pins shown in FIG. 4.

FIG. 15 is a right end elevation of the pin shown in FIG. 14.

DESCRIPTION OF THE PREFERRED EMBODIMENTS

Figure 1:
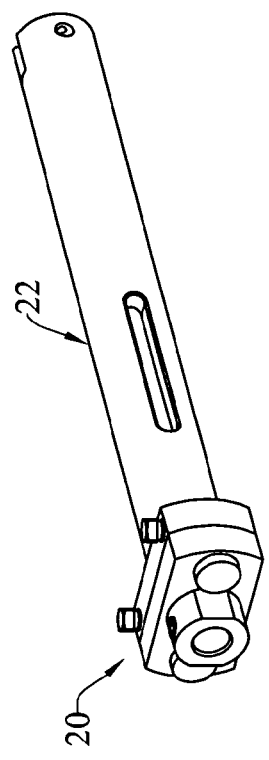
FIG. 1 is a perspective view of a stationary spindle showing the improved quick-change and adjustment mechanisms mounted thereon.
Figure 2:
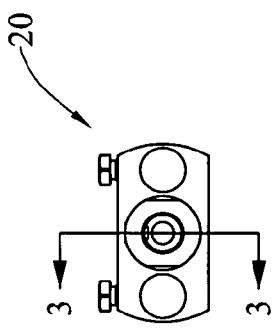
FIG. 2 is a left end elevational of the apparatus shown in FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 3:
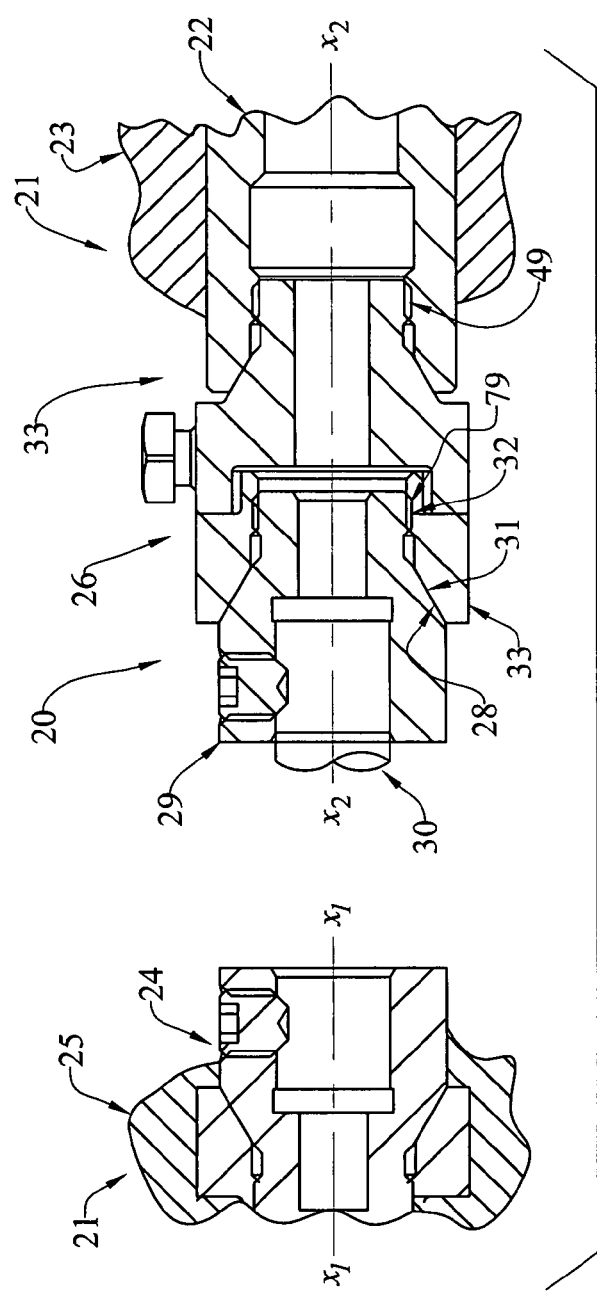
FIG. 3 is a fragmentary longitudinal vertical sectional view, taken generally on line 3—3 of FIG. 2, of the left marginal end portion of the apparatus shown in FIG. 1 in aligned spaced relation to a rotatable spindle of an indexable head.

Turning now to the drawings, and, more particularly, to FIGS. 1–4 thereof, the present invention provides an improvement, generally indicated at 20, for use with a Davenport® automatic screw machine, portions of which are fragmentarily indicated at 21 in FIG. 3, having a stationary spindle 22 mounted on a stationary head 23 in axially-spaced generally-aligned relation to a rotatable spindle 24 mounted on an indexable head 25.

The improvement broadly provides a quick-change mechanism 26 that is operatively associated with stationary spindle 22. The improved mechanism includes a frusto-conical surface 28 on the stationary spindle, a tool holder 29 adapted to hold a tool 30 and having a frusto-conical second surface 31. The first and second frusto-conical surfaces are so configured and arranged as to urge the tool holder to move radially toward a con-centric position with respect to the longitudinal axis ($x_2$—$x_2$) of the stationary spindle when the tool holder is moved axially to engage the second spindle. The improvement further includes a multi-lead threaded connection 32 between the tool holder and the stationary spindle such that the tool holder may be quickly locked into mating engagement with the stationary spindle by relative rotation therebetween through a short angular distance.

In the preferred embodiment, the multi-lead threaded connection is a quad-lead threaded connection having four separate parallel helically-wound threads starting at 90° spaced intervals. In FIG. 3, the tool holder 29 is shown as being mounted in an adjustment mechanism, generally indicated at 33. This is to allow for adjustment of the radial position of the tool axis relative to the rotating spindle axis ($x_1$—$x_1$). However, this is not invariable. Indeed, tool holder 29 may be mounted directly in the left marginal end of spindle 22. In this alternative embodiment, there would be a multi-lead threaded connection between the tool holder and the spindle directly. Preferably this is also a quad-lead threaded connection, as previously described. This quad-lead threaded connection will allow the tool holder to be matingly engaged with either the adjustment mechanism 33 or with spindle 22 by relative rotation of less than about one complete revolution. In the preferred embodiment, such lock-up will occur in rotation of about three-quarters of one revolution.

Referring now in particular to FIGS. 3 and 4, the adjustment mechanism 33 is shown as broadly including a base member 34; an adjustment member 35; a tool holder 29; and a locking mechanism 37 including two pins, severally indicated at 36, and two screws, severally indicated at 38.

As best shown in FIGS. 5 and 6, the base part 34 is shown as having planar upper and lower surfaces 39, 40, an outer peripheral surface that includes opposite planar side surfaces 41, 42 and opposite rounded end surfaces 43, 44 depending from upper surface 39, a downwardly-facing horizontal planar surface 45, an outwardly- and leftwardly-facing frusto-conical surface 46, an annular groove 48 extending radially inwardly, and an externally-threaded surface 49 continuing downwardly therefrom to join the outer marginal of lower end face 40. The base part as a central through-hole bounded by a small diameter portion 50 and a large diameter portion 51 continuing upwardly therefrom to join upper surface 39. Two lateral through-holes, severally indicated at 52, extend between surfaces 39, 45 on either side of the central hole. Each hole 52 is intersected by a horizontal hole, severally indicated at 53. Hole 53 is tapped to receive mating insertion of screws 38.

As best shown in FIGS. 4, 7 and 8, the adjustment member 35 is shown as having a planar upper surface 54, an downwardly-facing annular lower surface 55, opposite planar side walls 56, 58 and opposite rounded end walls 59, 60, that are generally arranged to be substantially coincident with base member surfaces 41, 42, 43, 44, respectively. The adjustment member 35 has a central through-hole which includes a downwardly- and inwardly-facing frusto-conical surface 61 extending upwardly from lower end face 55, an inwardly-facing vertical cylindrical surface 62, an upwardly- and inwardly-facing frusto-conical surface 63, an inwardly-facing vertical cylindrical surface 64, and an inwardly- and upwardly-facing frusto-conical surface 65 continuing upwardly therefrom to join upper surface 54. Two lateral holes, severally indicated at 66, extend through the adjustment part so as to communicate upper surface 54 with intermediate surface 68. Holes 66 are arranged to be generally aligned with holes 52 in the base part. The portion of the adjustment part defined between outwardly-facing horizontal cylindrical surface 69, lower end face 65, and cylindrical surface portion 62 defines a downwardly-extending cylindrical collar which is adapted to be received in the large-diameter recess 51 of the base member. This is not a tight connection. Rather, there is some clearance between this collar and the upper opening end of the base portion to allow the adjustment member to be moved relative to the base member by surface 68 sliding on surface 39.

Referring now to FIGS. 4 and 9–11, tool holder 29 is shown as being a specially-configured member having an planar upper horizontal surface 70, a planar annular lower surface 71, and an outer surface that includes rounded surfaces 72, 73 and flat portions 74, 75, a frusto-conical surface 76, an annular groove 78, and an externally-threaded portion 79 continuing downwardly therefrom to join lower end face 71. As indicated above, threaded portion 79 has a multiple-lead, and preferably a quad-lead threaded connection with the spindle and with the adjustment member 35 of the adjustment mechanism. As best shown in FIG. 11, the tool holder has a central through-hole which includes an upwardly- and inwardly-facing frusto-conical surface 80 extending downwardly from upper end face 70, an inwardly-facing vertical cylindrical surface 81, a downwardly-facing annular horizontal surface 82, an inwardly-facing vertical cylindrical surface 83, an upwardly-facing annular horizontal surface 84, an inwardly-facing vertical cylindrical surface 85 and a downwardly- and inwardly-facing frusto-conical surface 86 continuing downwardly therefrom to join the inner marginal of lower end face 71. A horizontal hole 88 extends between surfaces 72 and 81. This hole is tapped, and is adapted to receive set screw 90 (FIG. 4) by means of which tool 30 may be removably held in the tool holder.

Referring now to FIGS. 4, 12 and 13, screw 38 is shown as being a specially-configured member having a polygonal head portion 89, a threaded shank portion 90, and a generally-convex right marginal end portion 91. More particularly, this end portion includes a frusto-conical surface 92.

As best shown in FIGS. 4, 14 and 15, pin 36 includes a cylindrical head portion 93 and a shank portion 94. The lower surface 95 of head portion 93 is adapted to bear against the upper surface 54 of the adjustment member 34. The elongated shank portion 94 of the pin is adapted to pass through aligned holes 66, 52. Once in this position, screws 38 are adapted to be threaded into their respective holes, and selectively tightened against pins 36 to firmly hold the adjustment member in a desired position relative to the base member. To this end, each pin has a blind hole 95 provided with a generally-con-cave surface including frusto-conical surface 96. The frusto-conical nose of screw 38 is adapted to engage a proximate portion of pin surface 96 to firmly hold the adjustment member in a desired position relative to the base member.

Thus, the invention broadly provides an improved quick-change mechanism that is operatively associated with a stationary spindle. The mechanism includes a frusto-conical first surface on the stationary spindle; a tool holder adapted to hold a tool and having a frusto-conical second surface, the first and second surfaces being so configured and arranged as to urge the tool holder to move radially toward a concentric position with respect to the stationary spindle longitudinal axis when the tool holder is moved axially to engage the stationary spindle; and a multi-lead threaded connection between the tool holder and the stationary spindle such that the tool holder may be quickly locked into mating engagement with the stationary spindle by relative rotation therebetween through a short angular distance. As noted above, the multi-lead connection is preferably a quad-lead threaded connection, and less than one relative revolution is needed to lock the tool holder into tight engagement with the spindle.

In another aspect, the invention may also include an adjustment mechanism that broadly includes a base member adapted to be selectively mounted on the stationary spindle; an adjustment member adapted to be movably mounted on the base member and adapted to receive a tool holder; and a locking mechanism for selectively holding the adjustment member in a desired position relative to the base member. This position is generally that at which the axis of tool 30 is aligned with the axis of the rotatable spindle in the rotatable head.

The locking mechanism broadly includes at least one first hole provided through the adjustment member; at least one second hole provided through the base member and adapted to be aligned with the first hole; a pin having a head portion engaging the adjustment member and having a shank portion passing through the first and second holes; wherein the base member is provided with a tapped hole intersecting the second hole; and a screw arranged in the third hole and engaging the pin to hold the adjustment member in the desired relative position to the base member.

Modifications

The present invention expressly contemplates that many changes and modifications may be made.

For example, the materials of construction are not deemed critical, and may be readily changed or varied, as desired. While it is desired to have a multi-lead threaded connection between the tool holder and the adjustment member and the spindle, such multi-lead threaded connection could be a quad-lead or some other threaded connection. The shape and configuration of the base and adjustment members may be changed or varied. Similarly, other forms of locking means and mechanisms might be employed.

Therefore, while the presently-preferred form of the improved quick-change mechanism has been shown and described, and several modifications thereof discussed, persons skilled in this art will readily appreciate that various additional changes and modifications may be made without departing from the spirit of the invention, as defined and differentiated by the following claims.

What is claimed is:

1. In an automatic screw machine having a stationary spindle mounted on a stationary head in axially-spaced relation to a rotatable spindle mounted on an indexable head, the improvement comprising:
    a quick-change mechanism operatively associated with said stationary spindle, said mechanism including
        a frusto-conical first surface on said stationary spindle;
        a tool holder adapted to hold a tool and having a frusto-conical second surface, said first and second surfaces being so configured and arranged as to urge said tool holder to move radially toward a concentric position with respect to a longitudinal axis of said stationary spindle when said tool holder is moved axially to engage said stationary spindle; and
        a multiple-lead threaded connection between said tool holder and said stationary spindle such that said tool holder may be quickly locked into mating engagement with said stationary spindle by relative rotation therebetween through a short angular distance of less than about one revolution of said tool holder relative to said stationary spindle.

2. The improvement as set forth in claim 1 wherein said multiple-lead threaded connection is a quad-lead threaded connection.

3. The improvement as set forth in claim 1 wherein said short angular distance is about three-quarters of one revolution of said tool holder relative to said stationary spindle.

4. The improvement as set forth in claim 1 and further comprising:
    an adjustment mechanism for permitting the longitudinal axis of said stationary spindle to be selectively aligned with the longitudinal axis of said rotary spindle and for selectively holding said tool holder in such axially-aligned position.

5. The improvement as set forth in claim 4 wherein said adjustment mechanism includes:
    a base member adapted to be selectively mounted on said stationary spindle;
    an adjustment member adapted to be movably mounted on said base member and adapted to receive said tool holder; and
    at least one locking mechanism for selectively holding said adjustment member in a desired position relative to said base member.

6. The improvement as set forth in claim 5 wherein said base member has a frusto-conical third surface configured and arranged to urge said base member to move radially toward a concentric position with respect to said stationary spindle when said base member is moved axially to engage said stationary spindle.

7. The improvement as set forth in claim 6 and further including a further multiple-lead threaded connection between said base member and said stationary spindle such that said base member may be quickly locked into mating engagement with said stationary spindle by relative movement through a short angular distance of less than about one revolution of said base member relative to said stationary spindle.

8. The improvement as set forth in claim 7 wherein said further multiple-lead threaded connection is a quad-lead threaded connection.

9. The improvement as set forth in claim 7 wherein said short angular distance is about three-quarters of one revolution of said base member relative to said stationary spindle.

10. The improvement as set forth in claim 5 wherein said adjustment member has an opening arranged to receive the portion of said tool holder having said second surface.

11. The improvement as set forth in claim 10 wherein said adjustment member is sized so as to permit some movement of said adjustment member relative to said base member in a radial direction relative to the axis of said second surface.

12. The improvement as set forth 5 wherein each locking mechanism includes:
    at least one first hole provided through said adjustment member;
    at least one second hole provided in said base member and adapted to be aligned with said at least one first hole;
    a pin having a head portion engaging said adjustment member and having a shank portion passing through said at least one first and second holes;
    wherein said base member is provided with a tapped hole intersecting said at least one second hole; and
    a screw arranged in said tapped hole and engaging said pin to hold said adjustment member to said base member.

13. The improvement as set forth in claim 12 wherein at least two of said locking mechanisms are provided.

14. The improvement as set forth in claim 12 wherein said pin has a concave surface and wherein said screw has a convex surface arranged to engage the concave surface.

* * * * *